United States Patent
Sato

(10) Patent No.: US 6,181,484 B1
(45) Date of Patent: Jan. 30, 2001

(54) COMPACT TWO-GROUP WIDE-ANGLE ZOOM LENS

(75) Inventor: Kenichi Sato, Omiya (JP)

(73) Assignee: Fuji Photo Optical Co., Ltd., Saitama (JP)

( * ) Notice: Under 35 U.S.C. 154(b), the term of this patent shall be extended for 0 days.

(21) Appl. No.: 09/314,027

(22) Filed: May 19, 1999

Related U.S. Application Data

(63) Continuation-in-part of application No. 08/946,071, filed on Oct. 7, 1997, now abandoned.

(30) Foreign Application Priority Data

Nov. 28, 1996 (JP) ..................................................... 8-334990

(51) Int. Cl.[7] ............................. G02B 15/14; G02B 13/18
(52) U.S. Cl. ........................................... 359/692; 359/708
(58) Field of Search ..................................... 359/692, 691, 359/683, 676, 708, 713–717

(56) References Cited

U.S. PATENT DOCUMENTS 5,493,448 * 2/1996 Betensky et al. ..................... 359/692

FOREIGN PATENT DOCUMENTS 9101454    4/1997 (JP) .

* cited by examiner

Primary Examiner—Georgia Epps
Assistant Examiner—Jordan M. Schwartz
(74) Attorney, Agent, or Firm—Snider & Associates; Ronald R. Snider

(57) ABSTRACT

In a compact wide-angle zoom lens having a two-group configuration composed of positive and negative lens groups, the first lens group is composed of G1A and G1B groups, while a stop is disposed between the G1A and G1B groups, thereby yielding a small lens thickness at its telephoto end and making it compact. The first lens group G1 is composed of G1A group comprising, successively from the object side, a negative lens having a meniscus form with a concave surface directed onto the object side and a positive lens having a meniscus form with a convex surface directed onto the object side, and G1B group having at least one biconvex lens. A shutter (stop) is disposed between the G1A and G1B groups, thereby allowing the first and second lens groups to be disposed close to each other at the telephoto end. Further, the zoom lens is set so as to satisfy the following conditional expressions:

$$-0.6 < f'w/f'g1a < 1.4,\ 0.07 < Dab/f'w < 0.25$$

wherein:

f'w is the rear-side focal length of the whole lens system at the wide-angle end;
f'g1a is the focal length of the G1A group;
Dab is the air space between the G1A group and the G1B group.

2 Claims, 9 Drawing Sheets

EXAMPLE 1

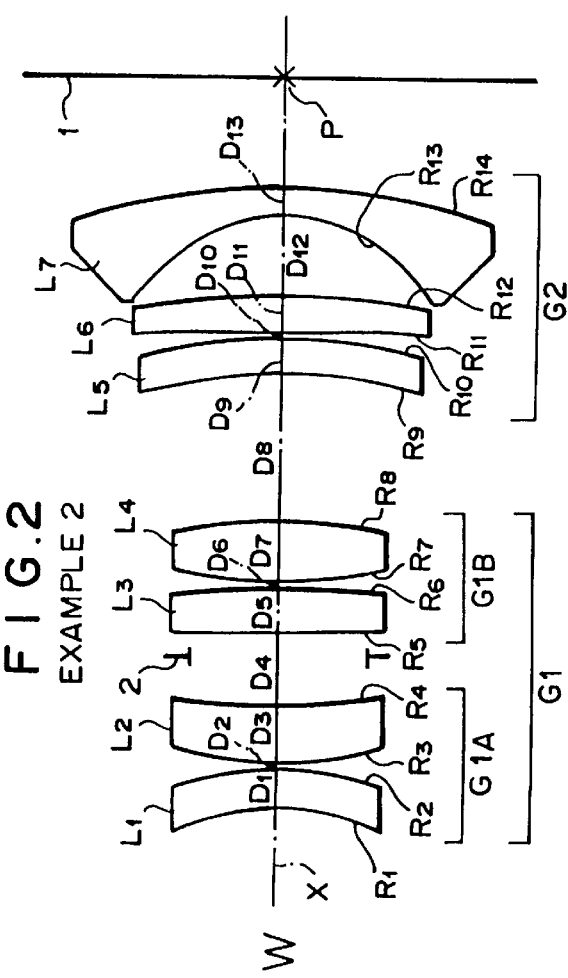
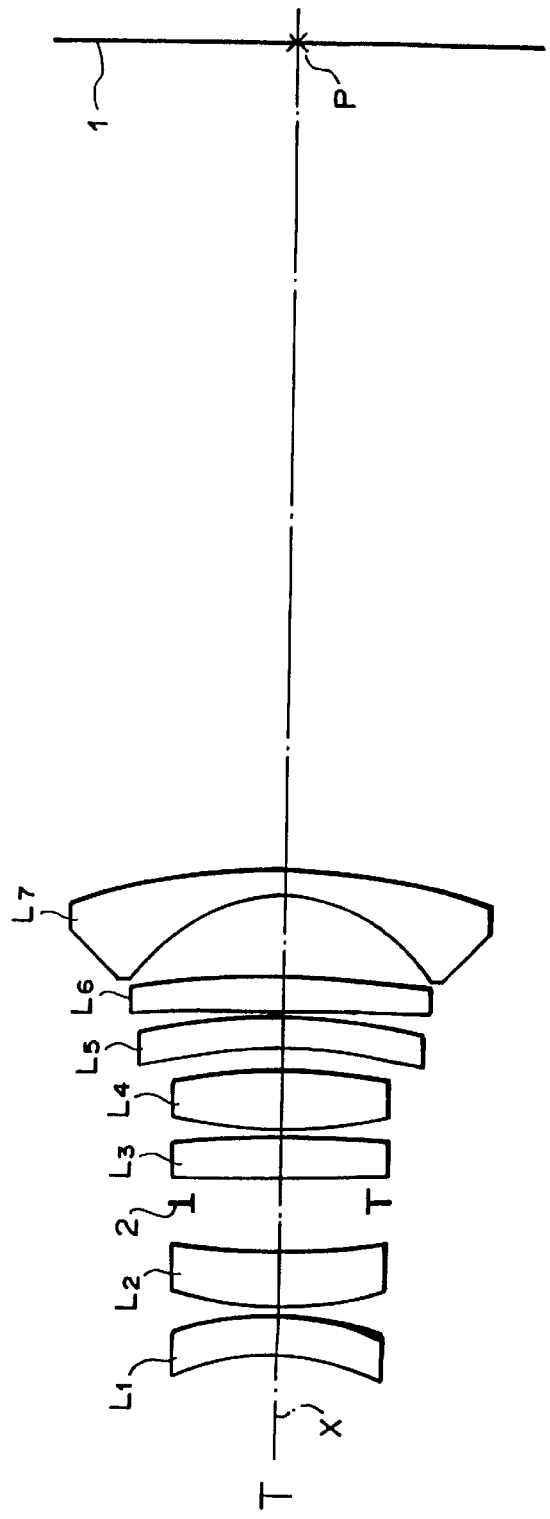
FIG.2
EXAMPLE 2

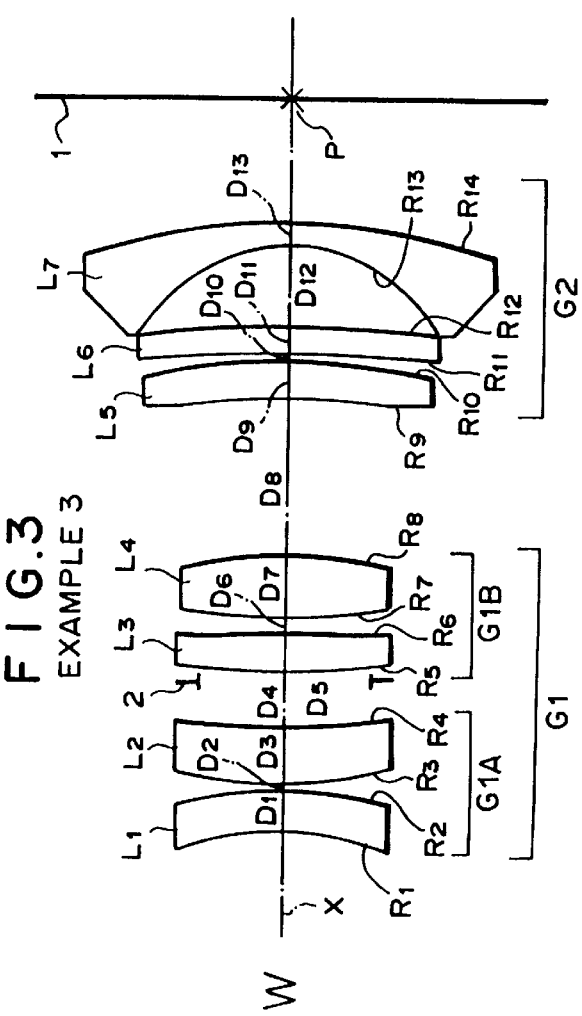
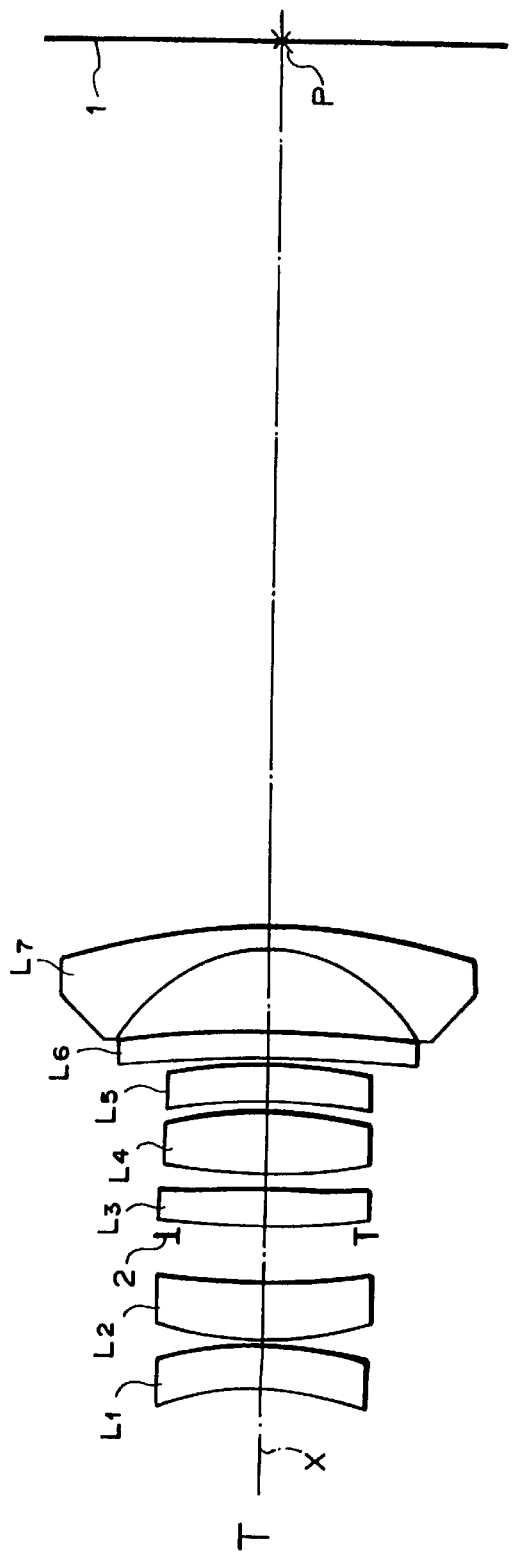
FIG.3 EXAMPLE 3

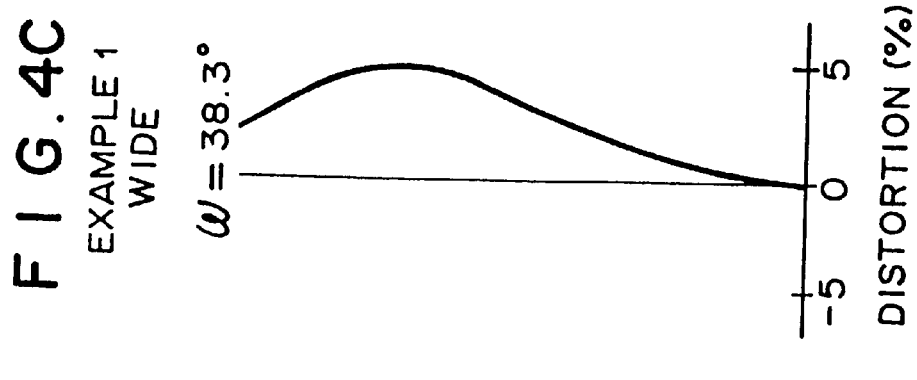
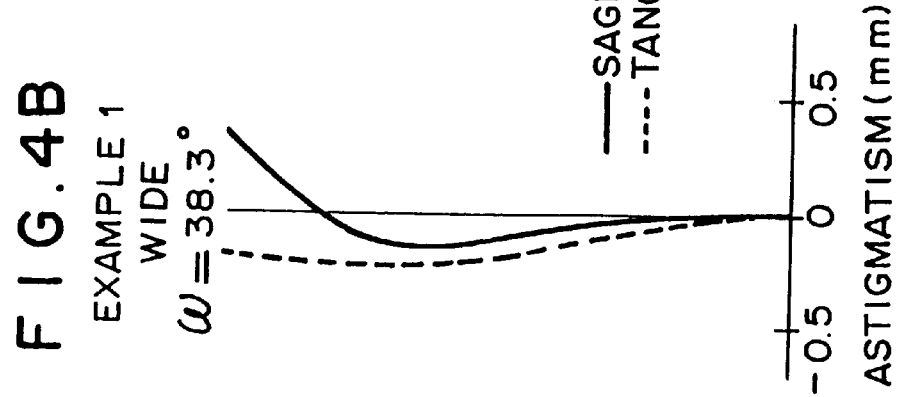
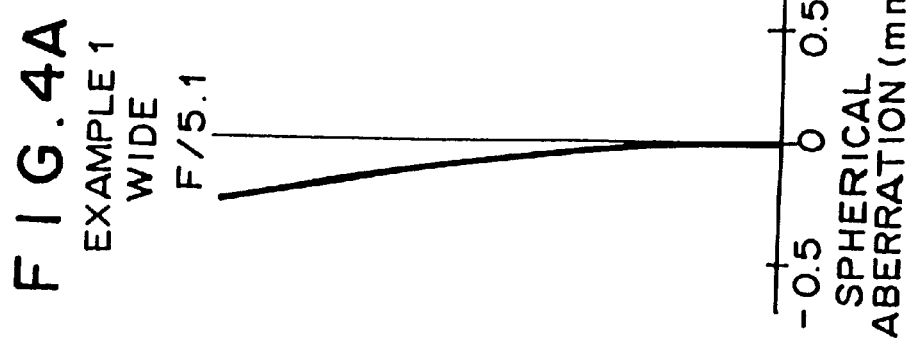

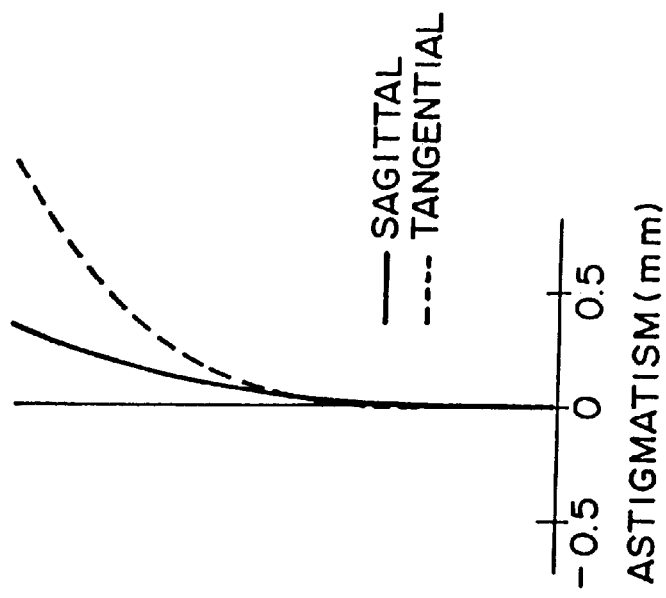
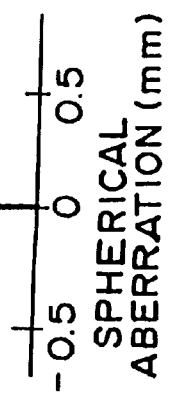

EXAMPLE 2
WIDE
F/5.1

EXAMPLE 2
WIDE
ω = 38.3°

— SAGITTAL
--- TANGENTIAL

EXAMPLE 2
WIDE
ω = 38.3°

EXAMPLE 2
TELE
ω=17.1°

EXAMPLE 2
TELE
ω=17.1°

EXAMPLE 2
TELE
F/7.1

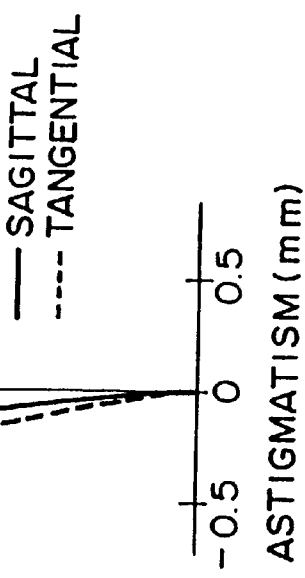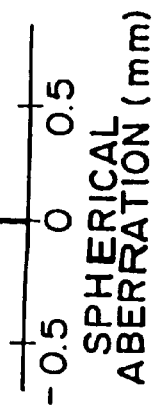

EXAMPLE 3
TELE
ω=16.6°

EXAMPLE 3
TELE
ω=16.6°

EXAMPLE 3
TELE
F/7.1

COMPACT TWO-GROUP WIDE-ANGLE ZOOM LENS

RELATED APPLICATIONS

The present application is a continuation-in-part of U. S. patent application Ser. No. 08/946,071 filed on Oct. 7, 1997, now abandoned.

BACKGROUND OF THE INVENTION

1. Field of the Invention

The present invention relates to a compact two-group wide-angle zoom lens for a lens shutter camera, which covers a wide angle area by two lens groups.

2. Related Background Art

Recently, as a lens system used for lens shutter cameras, that loaded with a zoom lens has been becoming the mainstream. Since such a zoom lens requires its compactness in the first place, there has been put into practice a two-group zoom lens with a telephoto type of refracting power arrangement, comprising a first lens group with a positive refracting power and a second lens group with a negative refracting power.

Further, there have been known various configurations in which an aspheric surface is used for a lens surface so as to reduce the number of lens sheets, while improving optical performances.

As such art, commonly-assigned Japanese Unexamined Patent Publication No., 9-101454 (Japanese Patent Application No. 7-284551) discloses a technique which can also restrain refractive index from fluctuating upon changes in a plastic lens with respect to temperature.

In the above-mentioned technique, however, since a lens shutter is disposed between the first and second lens groups, which change the distance therebetween upon zooming, it is necessary for these lens groups to secure a considerable amount of distance therebetween when they are moved to the telephoto end. Here, it is thus difficult for the whole lens thickness to be greatly reduced.

SUMMARY OF THE INVENTION

In view of such circumstances, it is an object of the present invention to provide a compact two-group wide-angle zoom lens which can greatly reduce the whole lens thickness when the lens system is positioned at its telephoto end and yield more compactness, while maintaining favorable optical performances.

The compact two-group wide-angle zoom lens in accordance with the present invention consisting, successively from an object side, a positive first lens group G1 having at least one aspheric surface and a negative second lens group G2, in which a distance between said lens groups is changed to attain a variable power;

wherein said first lens group G1 is composed of G1A group and G1B group;

wherein a stop is disposed between said G1A and G1B groups; and wherein said zoom lens satisfies the following conditional expressions:

$$-0.6 < f'w/f'g1a < 1.4 \quad (1)$$

$$0.07 < Dab/f'w < 0.25 \quad (2)$$

wherein:

f'w is the rear-side focal length of the whole lens system at the wide-angle end;

f'g1a is the focal length of the G1A group;

Dab is the air space between the G1A group and the G1B group.

Further, the compact two-group wide-angle zoom lens in accordance with the present invention consisting, successively from an object side, a positive first lens group G1 having at least one aspheric surface and a negative second lens group G2, in which a distance between the lens groups is changed to attain a variable power;

wherein the first lens group G1 is composed of G1A group comprising, successively from the object side, a negative lens having a meniscus form with a concave surface directed onto the object side and a positive lens having a meniscus form with a convex surface directed onto the object side, and G1B group having at least one biconvex lens;

wherein the second lens group G2 comprises, successively from the object side, a meniscus lens having an aspheric surface with a concave surface directed onto the object side, a positive lens having a convex surface directed onto the object side, and a negative lens having a concave surface directed onto the object side;

wherein a stop is disposed between the G1A and G1B groups; and wherein the zoom lens satisfies the following conditional expressions:

$$-0.6 < f'w/f'g1a < 1.4 \quad (1)$$

$$0.07 < Dab/f'w < 0.25 \quad (2)$$

wherein:

f'w is the rear-side focal length of the whole lens system at the wide-angle end;

f'g1a is the focal length of the G1A group;

Dab is the air space between the G1A group and the G1B group.

BRIEF DESCRIPTION OF THE DRAWINGS

FIG. 2 is a schematic view showing a basic lens configuration in accordance with Example 2 of the present invention;

FIG. 3 is a schematic view showing a basic lens configuration in accordance with Example 3 of the present invention;

FIGS. 4A, 4B, and 4C are aberration charts of the lens in accordance with Example 1 at its wide-angle end;

FIGS. 5A, 5B, and 5C are aberration charts of the lens in accordance with Example 1 at its telephoto end;

FIGS. 8A, 8B, and 8C are aberration charts of the lens in accordance with Example 3 at its wide-angle end.

DESCRIPTION OF THE PREFERRED EMBODIMENTS

In the following, specific examples of the present invention will be explained with reference to the drawings.

Example 1

Figure 1:
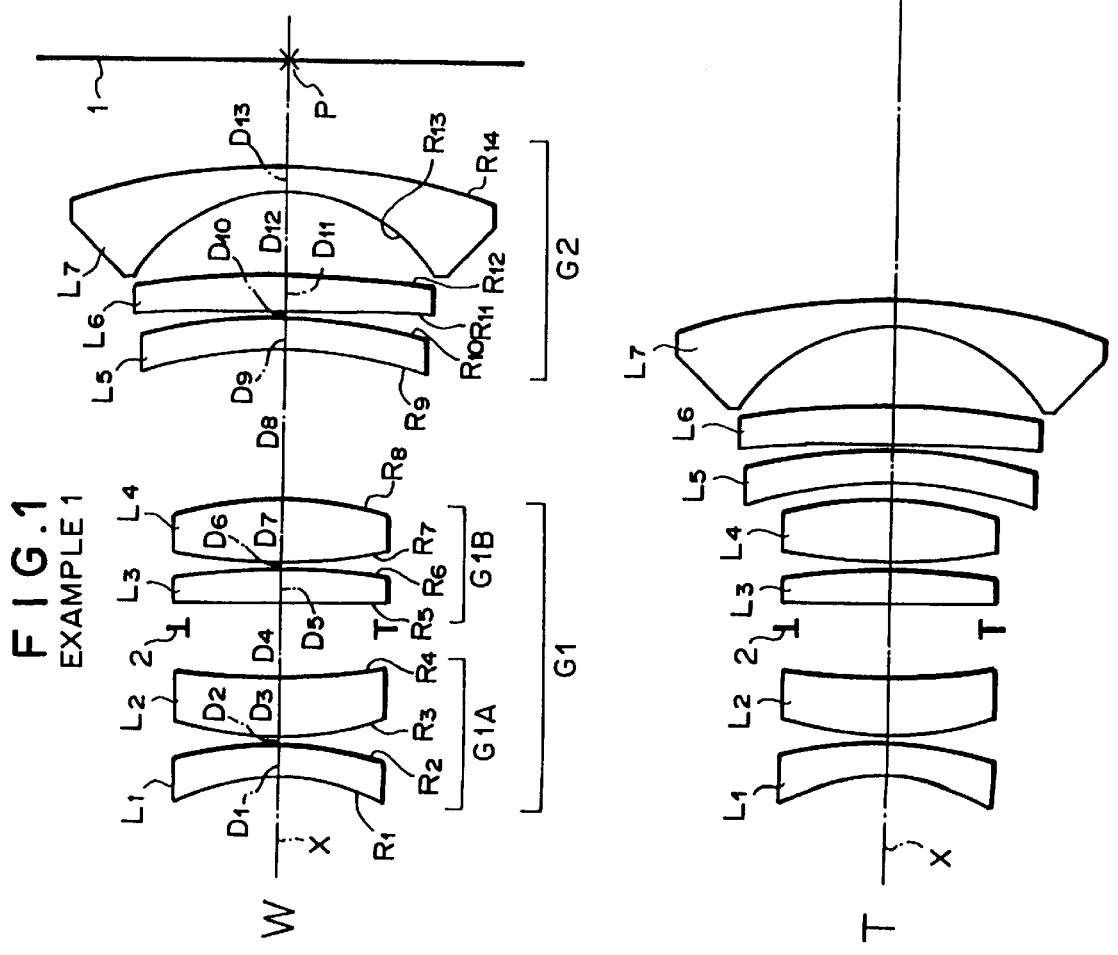
FIG. 1 is a schematic view showing a basic lens configuration in accordance with Example 1 of the present invention.

The compact two-group wide-angle zoom lens in accordance with Example 1 shown in FIG. 1 (with its positions at wide-angle and telephoto ends being respectively indicated by W and T, as with the following FIGS. 2 and 3) comprises, successively from the object side, a positive first lens group G1 having at least one aspheric surface and a negative second lens group G2. These lens groups move along an optical axis X while changing the distance therebetween, thus changing the focal length f of the whole system and efficiently converging a luminous flux onto an imaging point P on an imaging surface 1.

The first lens group G1 comprises, successively from the object side, G1A group comprising, successively from the object side, a first lens $L_1$ made of a negative lens having a meniscus form with a concave surface directed onto the object side and a second lens $L_2$ made of a positive lens having a meniscus form with a convex surface directed onto the object side; and G1B group comprising, successively from the object side, a third lens $L_3$ made of a plano-convex lens having a convex surface directed onto the image side and a fourth lens $L_4$ made of a biconvex lens having two aspheric surfaces with its stronger-curvature surface directed onto the image side. The second lens group G2 comprises, successively from the object side, a fifth lens $L_5$ made of a positive meniscus lens having two aspheric surfaces with its concave surface directed onto the object side, a sixth lens $L_6$ made of a biconvex lens having an aspheric surface on the object side with its stronger-curvature surface directed onto the object side, and a seventh lens $L_7$ made of a negative meniscus lens having a concave surface directed onto the object side.

The most characteristic feature of this two-group zoom lens lies in that a shutter (stop) 2 is disposed between the above-mentioned G1A and G1B groups. As the shutter 2 is disposed between these two lens groups, the whole lens thickness at the telephoto end (T) is kept small, whereby more compactness can be attained. Here, since the above-mentioned G1A and G1B groups inherently necessitate a certain amount of space therebetween in order to correct aberration, this space is utilized for inserting the shutter 2.

Also, since the first lens $L_1$ is made of a negative meniscus lens having a concave surface directed onto the object side as mentioned above, image surface curvature and distortion, which may become problematic at the wide-angle end, can be restrained from occurring. Also, since the second lens $L_2$ disposed directly downstream the lens $L_1$ is made of a positive meniscus lens, back focus can be kept short.

Further, the two-group zoom lens of this example is set so as to satisfy the following conditional expressions:

$$-0.6 < f'w/f'g1a < 1.4 \quad (1)$$

$$0.07 < Dab/f'w < 0.25 \quad (2)$$

wherein:
f'w is the rear-side focal length of the whole lens system at the wide-angle end;
f'g1a is the focal length of the G1A group;
Dab is the air space between the G1A group and the G1B group.

In the following, the technical significance of each of the above-mentioned expressions will be explained in brief.

Below the lower limit of the above-mentioned conditional expression (1), the whole lens length becomes too long. Above the upper limit thereof, the image surface fluctuates too much upon zooming.

Below the lower limit of the above-mentioned conditional expression (2), it becomes difficult to secure the space for accommodating the shutter, while coma increases so much that it cannot be corrected. Above the upper limit, the whole lens length becomes so long that it is hard to satisfy the request for compactness.

In this example, as the configuration of each lens and the above-mentioned conditional expressions are satisfied as mentioned above, various kinds of aberration in any object distance ranging from long distance to near distance can be favorably corrected, while satisfying the request for compactness, thus yielding high optical performances throughout the object distance.

Table 1 (follows) shows the radius of curvature R (mm) of each lens surface, the center thickness of each lens and air gap between neighboring lenses (collectively referred to as "axial spacing" hereinafter) D (mm), and the refractive index N and Abbe number ν of each lens at d-line in the zoom lens in accordance with this example.

In Table 1, the reference numbers successively increase from the object side.

Each of the surfaces marked with "*" on the right side of the surface number in Table 1 is shaped into an aspheric surface as mentioned above, which means that it is in an aspheric form represented by the following expression (A):

$$Z = CY^2/[1+(1-kC^2Y^2)^{1/2}] + AY^4 + BY^6 + CY^8 + DY^{10} \quad (A)$$

wherein
Z is a length (mm) of a perpendicular on a tangent plane (plane perpendicular to an optical axis) of an apex of an aspheric surface from a point on the aspheric surface at a height Y from the optical axis;
C (1/R) is a paraxial curvature of the aspheric surface;
Y is a height (mm) from the optical axis;
k is an eccentricity; and
A, B, C, and D are aspheric surface coefficients of the fourth, sixth, eighth, and tenth orders, respectively.

Table 2 (follows) shows values of the constants A, B, C, D, and k of the aspheric surfaces indicated by the above-mentioned expression (A).

Further, the focal length f', F No, and angle of view 2ω of the whole lens system in this example are set as shown in Table 3 (follows).

Further, the number of f'w, f'g1a, f'w/f'g1a, Dab, Dab/f'w of the lens system in this example are set as shown in Table 3.

Here, the shutter 2 is disposed at a position which is distanced from the image-side surface of the second lens $L_2$ by 1.97 mm toward the image side.

Example 2

The compact two-group wide-angle zoom lens in accordance with Example 2 is configured so as to be substantially similar to that of Example 1, as shown in FIG. 2, and satisfy the above-mentioned conditional expressions (1) and (2).

Table 4 (follows) shows the radius of curvature R (mm) of each lens surface, the axial spacing D (mm), and the refractive index N and Abbe number ν of each lens at d-line in the zoom lens in accordance with this example.

In Table 4, the reference numbers successively increase from the object side.

Each of the surfaces marked with "*" on the right side of the surface number in Table 4 is shaped into an aspheric surface, which means that it is in an aspheric form represented by the above-mentioned expression (A).

Table 5 (follows) shows values of the constants A, B, C, D, and k of the aspheric surfaces indicated by the above-mentioned expression (A).

Further, the focal length f', F No, and angle of view 2ω of the whole lens system in this example are set as shown in Table 6 (follows).

Further, the number of f'w, f'g1a, f'w/f'g1a, Dab, Dab/f'w of the lens system in this example are set as shown in Table 6.

Here, the shutter 2 is disposed at a position which is distanced from the image-side surface of the second lens $L_2$ by 1.97 mm toward the image side.

Example 3

The compact two-group wide-angle zoom lens in accordance with Example 3 is configured so as to be substantially similar to that of Example 1 while differing therefrom in that the third lens $L_3$ is made of a biconvex lens having a surface with a stronger curvature directed onto the image side, as shown in FIG. 3.

Table 7 (follows) shows the radius of curvature R (mm) of each lens surface, the axial spacing D (mm), and the refractive index N and Abbe number ν of each at d-line in the zoom lens in accordance with this example.

In Table 7, the reference numbers successively increase from the object side.

Each of the surfaces marked with "*" on the right side of the surface number in Table 7 is shaped into an aspheric surface, which means that it is in an aspheric form represented by the above-mentioned expression (A).

Table 8 (follows) shows values of the constants A, B, C, D, and k of the aspheric surfaces indicated by the above-mentioned expression (A).

Further, the focal length f', F No, and angle of view 2ω of the whole lens system in this example are set as shown in Table 9 (follows).

Further, the number of f'w, f'g1a, f'w/f'g1a, Dab, Dab/f'w of the lens system in this example are set as shown in Table 9.

Here, the shutter 2 is disposed at a position which is distanced from the image-side surface of the second lens $L_2$ by 1.52 mm toward the image side.

Figure 6A:
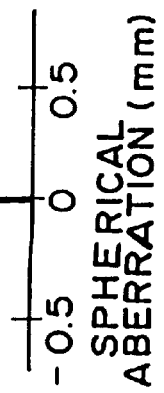
FIGS. 6A, 6B, and 6C are aberration charts of the lens in accordance with Example 2 at its wide-angle end.
Figure 6B:
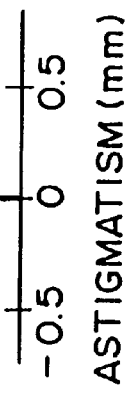
Figure 6C:
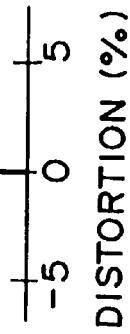
Figure 7C:
FIGS. 7A, 7B, and 7C are aberration charts of the lens in accordance with Example 2 at its telephoto end.
Figure 7B:
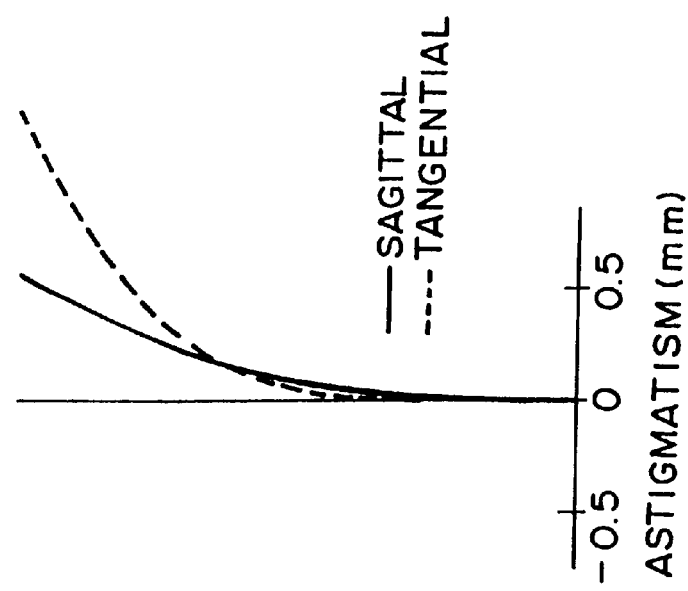
Figure 7A:
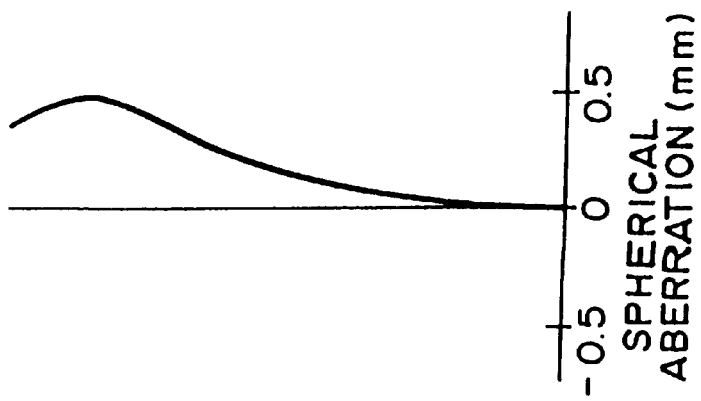
Figure 9C:
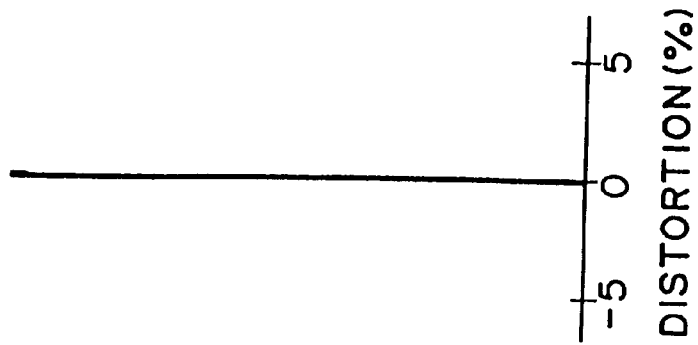
FIGS. 9A, 9B, and 9C are aberration charts of the lens in accordance with Example 3 at its telephoto end.
Figure 9B:
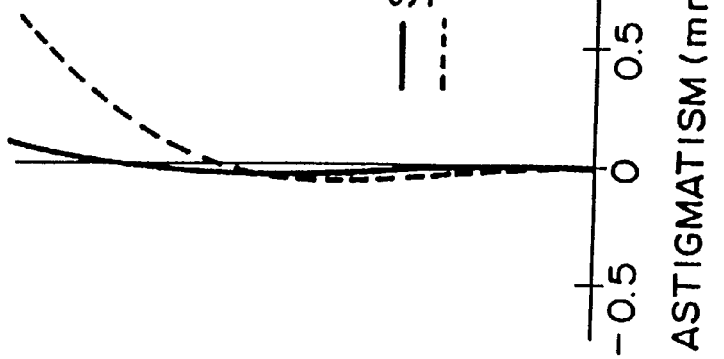
Figure 9A:
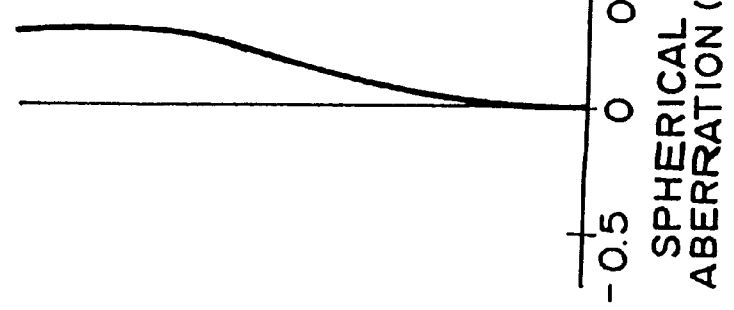

FIGS. 4, 6, and 8 are aberration charts showing various kinds of aberration (spherical aberration, astigmatism, and distortion) of the zoom lenses in accordance with the above-mentioned respective examples at their wide-angle end; whereas FIGS. 5, 7, and 9 are aberration charts showing various kinds of aberration (spherical aberration, astigmatism, and distortion) of the zoom lenses in accordance with the above-mentioned respective examples at their telephoto end. Here, each aberration chart concerning astigmatism shows aberrations with respect to sagittal (S) and tangential (T) image surfaces. As can be seen from these aberration charts, each kind of aberration can be favorably corrected by the zoom lens in accordance with each of the above-mentioned examples.

The zoom lens of the present invention should not be restricted to the above-mentioned examples. For example, the forms of lenses constituting each, lens group as well as the number and forms of the aspheric surfaces can be appropriately selected.

In the compact two-group wide-angle zoom lens of the present invention, a bright lens system can be obtained in a simple and compact two-group configuration. Also, its angle of view can be made wide, and the lens thickness can be reduced at its telephoto end. Further, various kinds of aberration in any object distance ranging from long distance to near distance can be corrected favorably.

TABLE 1

| Surface | R | D | N | ν |
|---|---|---|---|---|
| 1 | −10.689 | 1.47 | 1.84665 | 26.9 |
| 2 | −14.998 | 0.10 | | |
| 3 * | 16.224 | 2.37 | 1.58913 | 61.2 |
| 4 * | 47.351 | 2.97 | | |
| 5 | ∞ | 1.54 | 1.48749 | 70.4 |
| 6 | −33.386 | 0.10 | | |
| 7 | 23.737 | 2.53 | 1.48749 | 70.4 |
| 8 * | −19.488 | Variable (6.20 to 0.77) | | |
| 9 * | −13.358 | 1.45 | 1.49023 | 57.5 |
| 10 * | −19.745 | 0.10 | | |
| 11 | −148.940 | 1.60 | 1.80518 | 25.5 |
| 12 | −41.459 | 3.36 | | |
| 13 | −7.409 | 1.01 | 1.81550 | 44.4 |
| 14 | −27.964 | | | |

TABLE 2

| Surface | k | A | B | C | D |
|---|---|---|---|---|---|
| 3 | 2.58852 | $-5.28961 \times 10^{-5}$ | $4.14231 \times 10^{-6}$ | $1.85178 \times 10^{-10}$ | $7.65831 \times 10^{-11}$ |
| 4 | 1.39968 | $9.42627 \times 10^{-6}$ | $6.48244 \times 10^{-6}$ | $1.39374 \times 10^{-8}$ | $5.72503 \times 10^{-10}$ |
| 8 | 5.19990 | $1.30549 \times 10^{-4}$ | $8.63490 \times 10^{-7}$ | $-4.22957 \times 10^{-8}$ | $-4.40237 \times 10^{-10}$ |
| 9 | 3.49034 | $7.22814 \times 10^{-4}$ | $4.30777 \times 10^{-7}$ | $-9.81102 \times 10^{-9}$ | $-1.60338 \times 10^{-9}$ |
| 10 | 8.74971 | $4.79624 \times 10^{-4}$ | $1.27860 \times 10^{-7}$ | $-8.69028 \times 10^{-8}$ | $8.74971 \times 10^{-10}$ |

TABLE 3

| f' = 21.9 to 56.1 | F No = 5.1 to 7.1 | Angle of view 2ω = 76.5° to 34.2° |
|---|---|---|
| f'w = 21.9 | f'g1a = 152.1 | f'w/f'g1a = 0.144 |
| | Dab = 2.97 | Dab/f'w = 0.136 |

TABLE 4

| Surface | R | D | N | ν |
|---|---|---|---|---|
| 1 | −10.708 | 1.48 | 1.84665 | 23.9 |
| 2 | −15.135 | 0.10 | | |
| 3 * | 16.404 | 2.37 | 1.58913 | 61.2 |
| 4 * | 46.546 | 2.97 | | |
| 5 | ∞ | 1.79 | 1.71300 | 53.9 |
| 6 | −47.171 | 0.10 | | |
| 7 | 23.589 | 2.60 | 1.49530 | 81.6 |
| 8 * | −19.691 | Variable | | |

TABLE 4-continued

| Surface | R | D | N | v |
|---|---|---|---|---|
|  |  | (6.20 to 0.81) |  |  |
| 9 * | −13.589 | 1.45 | 1.49023 | 57.5 |
| 10 * | −19.816 | 0.10 |  |  |
| 11 | −148.331 | 1.50 | 1.80518 | 25.5 |
| 12 | −40.867 | 3.22 |  |  |
| 13 | −7.363 | 1.06 | 1.81550 | 44.4 |
| 14 | −28.440 |  |  |  |

TABLE 5

| Surface | k | A | B | C | D |
|---|---|---|---|---|---|
| 3 | 2.66841 | −5.19751 × 10⁻⁵ | 4.18420 × 10⁻⁶ | 1.20190 × 10⁻¹ | 5.92432 × 10⁻¹¹ |
| 4 | 1.40080 | 9.42627 × 10⁻⁶ | 6.48259 × 10⁻⁶ | 1.50816 × 10⁻⁸ | 6.08265 × 10⁻¹⁰ |
| 8 | 5.29571 | 1.30363 × 10⁻⁴ | 8.02987 × 10⁻⁷ | −4.03351 × 10⁻⁸ | −5.55055 × 10⁻¹⁰ |
| 9 | 3.49034 | 7.35446 × 10⁻⁴ | 5.06607 × 10⁻⁷ | −8.60922 × 10⁻⁹ | −1.48502 × 10⁻⁹ |
| 10 | 8.74971 | 4.89314 × 10⁻⁴ | 4.32118 × 10⁻⁷ | −8.11576 × 10⁻⁸ | 1.55770 × 10⁻¹⁰ |

TABLE 6

| f' = 21.9 to 56.3 | F No = 5.1 to 7.1 | Angle of view 2ω = 76.5° to 34.1° |
|---|---|---|
| f'w = 21.9 | f'gla = 181.0 | fw/f'gla = 0.121 |
|  | Dab = 2.97 | Dab/f'w = 0.136 |

TABLE 7

| Surface | R | D | N | v |
|---|---|---|---|---|
| 1 | −11.919 | 1.57 | 1.84665 | 23.9 |
| 2 | −17.788 | 0.10 |  |  |
| 3 * | 16.735 | 2.34 | 1.58913 | 61.2 |
| 4 * | 38.632 | 2.43 |  |  |
| 5 * | 141.545 | 1.50 | 1.58913 | 61.2 |
| 6 * | −39.443 | 0.65 |  |  |
| 7 | 28.486 | 2.58 | 1.48749 | 70.4 |
| 8 * | −18.651 | Variable (6.33 to 0.35) |  |  |
| 9 * | −18.932 | 1.60 | 1.49023 | 57.5 |
| 10 * | −19.003 | 0.10 |  |  |
| 11 | −88.547 | 1.20 | 1.84665 | 23.9 |
| 12 | −51.749 | 3.31 |  |  |
| 13 | −7.316 | 0.95 | 1.80236 | 46.7 |
| 14 | −27.186 |  |  |  |

TABLE 8

| Surface | k | A | B | C | D |
|---|---|---|---|---|---|
| 3 | −0.91578 | −1.91757 × 10⁻⁵ | 1.28614 × 10⁻⁷ | −1.10816 × 10⁻⁸ | 8.72131 × 10⁻¹¹ |
| 4 | 0.97110 | 0.0 | −2.18283 × 10⁻⁷ | −9.98124 × 10⁻⁹ | −2.90363 × 10⁻¹⁰ |
| 5 | 0.93290 | 3.27183 × 10⁻⁴ | 4.54893 × 10⁻⁶ | −7.21002 × 10⁻⁸ | −1.24349 × 10⁻⁹ |
| 6 | 0.68768 | 3.84013 × 10⁻⁴ | 8.23351 × 10⁻⁶ | −7.32471 × 10⁻⁸ | 8.61178 × 10⁻¹⁰ |
| 8 | 2.79275 | −3.75961 × 10⁻⁵ | −2.16012 × 10⁻⁶ | −3.70210 × 10⁻⁸ | −1.92628 × 10⁻¹⁰ |
| 9 | 3.05453 | 4.95951 × 10⁻⁴ | 2.29732 × 10⁻⁷ | 5.72170 × 10⁻⁹ | −6.59658 × 10⁻¹⁰ |
| 10 | 7.33984 | 3.71420 × 10⁻⁴ | 1.80256 × 10⁻⁶ | −5.37309 × 10⁻⁸ | 5.85641 × 10⁻¹⁰ |

TABLE 9

| f' = 22.6 to 58.0 | F No = 6.2 to 7.1 | Angle of view 2ω = 74.7° to 33.1° |
|---|---|---|
| f'w = 22.6 | f'gla = 995.5 | fw/f'gla = 0.023 |
|  | Dab = 2.43 | Dab/f'w = 0.108 |

What is claimed is:

1. A compact two-group wide-angle zoom lens consisting, successively from an object side, a positive first lens group G1 having at least one aspheric surface and a negative second lens group G2, in which a distance between said lens groups is changed to attain a variable power;

wherein said first lens group G1 consists of G1A group comprising, successively from the object side, a negative lens having a meniscus form with a concave surface directed onto the object side and a positive lens having a meniscus form with a convex surface directed onto the object side, and G1B group having at least one biconvex lens;

wherein said second lens group G2 comprises, successively from the object side, a meniscus lens having an aspheric surface with a concave surface directed onto the object side, a positive lens having a convex surface directed onto the object side, and a negative lens having a concave surface directed onto the object side;

wherein a stop is disposed between said G1A and G1B groups; and wherein said zoom lens satisfies the following conditional expressions:

$$-0.6 < fw/f'g1a < 1.4 \quad (1)$$

$$0.07 < Dab/f'w < 0.25 \quad (2)$$

wherein:

f'w is the rear-side focal length of the whole lens system at the wide-angle end;

f'g1a is the focal length of the G1A group;

Dab is the air space between the G1A group and the G1B group.

2. A compact two-group wide-angle zoom lens consisting, successively from an object side, a positive first lens group G1 having at least one aspheric surface and a negative second lens group G2, in which a distance between said lens groups is changed to attain a variable power;

wherein said first lens group G1 comprises G1A group comprising, successively from the object side, a negative lens having a meniscus form with a concave surface directed onto the object side and a positive lens having a meniscus form with a convex surface directed onto the object side, and G1B group having at least one biconvex lens;

wherein said second lens group G2 comprises, successively from the object side, a meniscus lens having an aspheric surface with a concave surface directed onto the object side, a positive lens having a convex surface directed onto the object side, and a negative lens having a concave surface directed onto the object side;

wherein a stop is disposed between said G1A and G1B groups; and wherein said zoom lens satisfies the following conditional expressions:

$$-0.6 < f'w/f'g1a < 1.4 \quad (1)$$

$$0.07 < Dab/f'w < 0.25 \quad (2)$$

wherein:

f'w is the rear-side focal length of the whole lens system at the wide-angle end;

f'g1a is the focal length of the G1A group;

Dab is the air space between the G1A group and the G1B group.

* * * * *